(12) United States Patent
Spruce

(10) Patent No.: US 7,029,578 B2
(45) Date of Patent: Apr. 18, 2006

(54) WATER TREATMENT SYSTEM

(75) Inventor: Frederick Spruce, Northwich (GB)

(73) Assignee: Spruce International Separations, Staffordshire (DE)

( * ) Notice: Subject to any disclaimer, the term of this patent is extended or adjusted under 35 U.S.C. 154(b) by 186 days.

(21) Appl. No.: 10/415,739

(22) PCT Filed: Nov. 1, 2001

(86) PCT No.: PCT/GB01/04846

§ 371 (c)(1),
(2), (4) Date: Feb. 11, 2004

(87) PCT Pub. No.: WO02/36234

PCT Pub. Date: May 10, 2002

(65) Prior Publication Data
US 2004/0129653 A1 Jul. 8, 2004

(51) Int. Cl.
B01D 24/02 (2006.01)

(52) U.S. Cl. .................. 210/177; 210/198.1; 210/275; 210/290

(58) Field of Classification Search ................ 210/177, 210/198.1, 275, 290
See application file for complete search history.

(56) References Cited

U.S. PATENT DOCUMENTS

| 293,745 | A | * | 2/1884 | Hyatt | 210/290 |
|---|---|---|---|---|---|
| 3,471,025 | A | * | 10/1969 | Dobson | 210/282 |
| 3,876,546 | A | | 4/1975 | Hsiung et al. | |
| 4,102,786 | A | | 7/1978 | Okada et al. | |
| 4,166,037 | A | * | 8/1979 | Montagnon | 210/275 |
| 4,187,175 | A | * | 2/1980 | Roberts et al. | 210/793 |
| 4,197,205 | A | | 4/1980 | Hirs | |
| 4,668,405 | A | | 5/1987 | Boze | |
| 5,164,085 | A | | 11/1992 | Spokoiny et al. | |
| 5,205,932 | A | | 4/1993 | Solomon et al. | |
| 5,552,046 | A | | 9/1996 | Johnston et al. | |
| 5,804,062 | A | | 9/1998 | Wyness | |
| 2004/0129653 | A1 | * | 7/2004 | Spruce | 210/807 |

FOREIGN PATENT DOCUMENTS

| GB | 1110559 | 4/1968 |
|---|---|---|
| GB | 1487914 | 10/1977 |
| JP | 10000476 | 1/1998 |
| WO | WO96/20139 | 7/1996 |
| WO | WO98/19766 | 5/1998 |

* cited by examiner

Primary Examiner—Robert James Popovics
Assistant Examiner—T. Woodruff
(74) Attorney, Agent, or Firm—Bracewell & Giuliani LLP

(57) ABSTRACT

A system suitable for the elimination of *Cryptosporidium* oocysts from water includes a filter bed comprising four layers of inert particulate material such that, from the top layer (first layer) to the bottom layer (fourth layer), the coarseness of the particles decreases while the density of the particulate material increases.

13 Claims, 2 Drawing Sheets

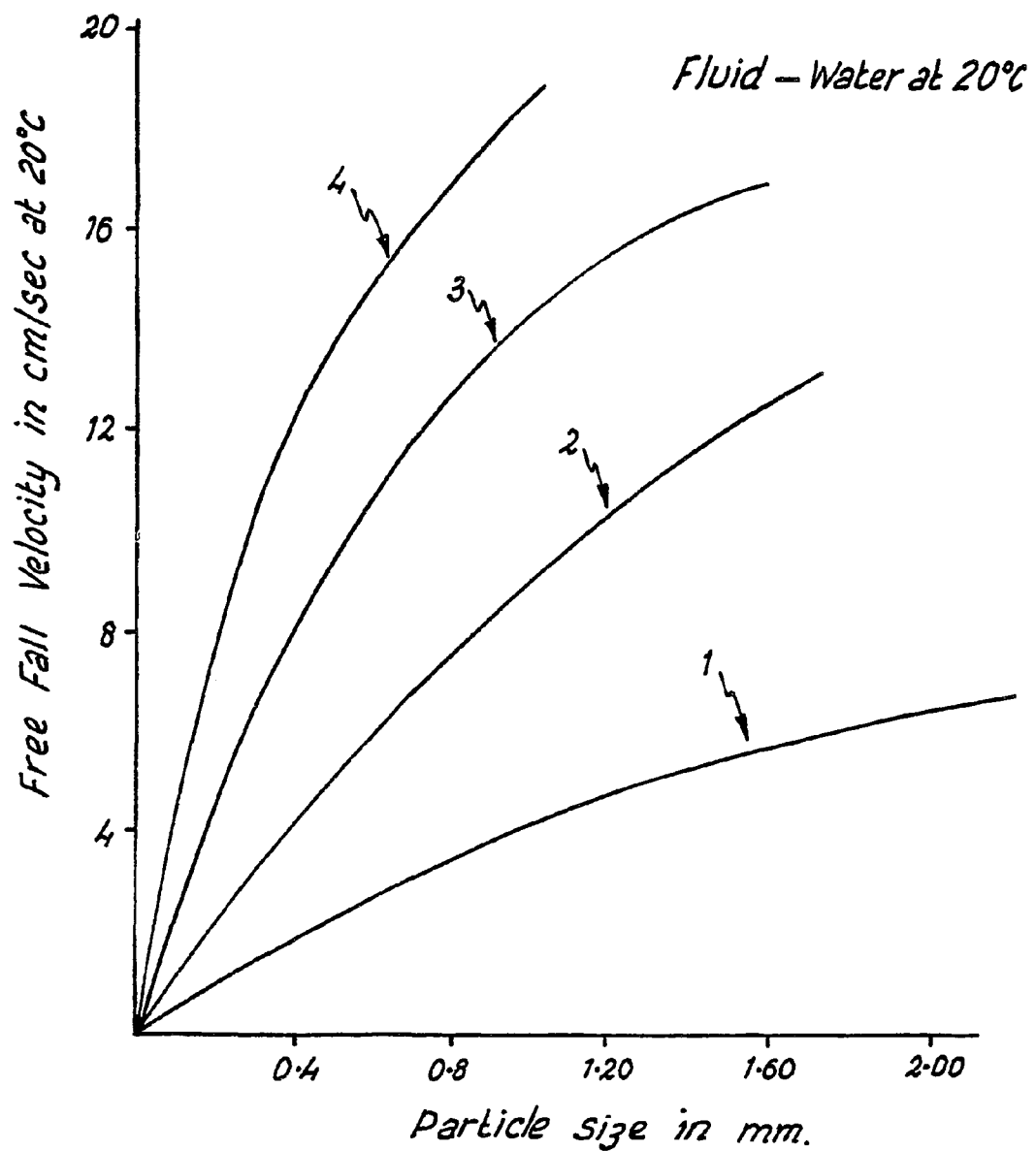

WATER TREATMENT SYSTEM

Figure 1:
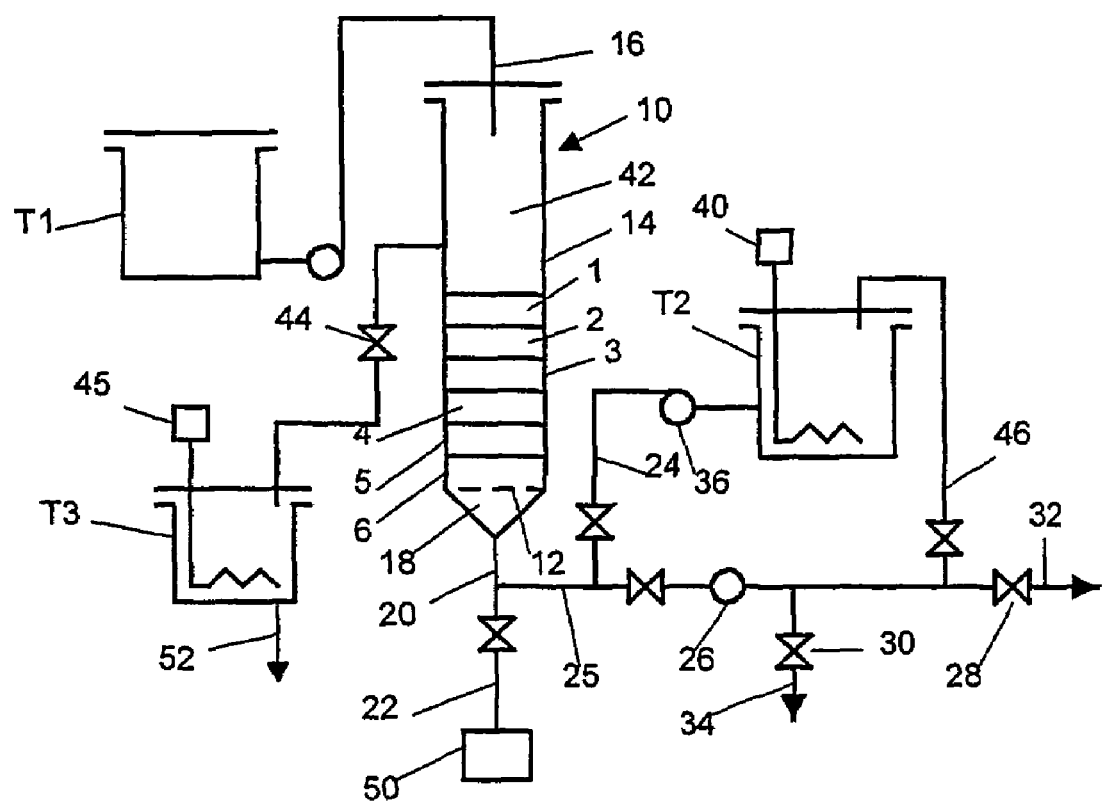

This invention relates to the treatment of water in order to eliminate contaminants, including disease-causing pathogenic microorganisms such as *Cryptosporidium* oocysts which are generally recognised as being between about 4 and about 10 microns in size.

Since the discovery of harmful *Cryptosporidium* oocysts in surface waters in the early 1980's, many water authorities have been involved in extensive laboratory and field investigations in an attempt to resolve this problem. More than five years after the report of a UK Government expert committee, *Cryptosporidium* continues to pose difficult challenges for the water industry. The parasite remains difficult to eradicate from water supplies despite many years of research. Standards for some of the drinking water supplies in the UK remain doubtful 'as safe to drink', particularly for vulnerable groups. Water companies therefore have the problem of complying with the prescribed complete removal of oocysts from filtered water.

Membrane filters are very effective for the removal of small particles from liquid but tend to clog easily and are therefore unsuitable for the removal of small contaminants from large volumes of liquid. Depth filters, e.g. sand filters, are more suitable for the filtration of large volumes of water as they are less prone to clogging but current designs of sand filters as currently used in the water treatment industry are not considered to be sufficiently efficient and economical to make the elimination of *Cryptosporidium* oocysts viable.

The present invention seeks to provide an improved system and process for the elimination of *Cryptosporidium* oocysts from water.

According to one aspect of the present invention there is provided, a system suitable for the elimination of *Cryptosporidium* oocysts from water, the system including a filter bed comprising four layers of inert particulate material such that, from the top layer (first layer) to the bottom layer (fourth layer), the coarseness of the particles decreases while the density of the particulate material increases.

The particulate materials selected for each layer will in general have good sphericity. Thus, the shape factor of the particles in each of the first, second and third layers is desirably at least 0.6 and the shape factor of the particles forming the fourth layer is desirably at least 0.5, more preferably at least 0.55.

As used herein, the term "shape factor" means the degree of sphericity where a value of unity corresponds to a sphere.

By selecting the particles so that they possess good sphericity, it is possible to secure substantially uniform growth/accumulation of bio-species and effective filtration and backwashing.

The shape factor of the particles in any one or more of the first, second and third layers is desirably at least about 0.65.

The shape factor of the particles in the fourth layer may be at least 0.6.

Preferably the particle size and density of the particulate material forming each layer is such that the free fall settling rate of the particles decreases from the top layer downwards. The difference in free fall settling rate may be at least 20% from one layer to the next, preferably at least 25%.

The free fall settling velocity is determined by allowing 20 individual particles to fall under gravity past two calibration marks on a transparent vertical tube filled with water maintained at a temperature of 20 degrees C., the tube being 70 mm inside diameter, one meter in length. The upper calibration mark is located 150 mm from the top of the tube and lower 650 mm from the top, viz. so that the two calibration marks are separated by a vertical distance of 500 mm. The particles are first thoroughly wetted with water and then released under water within the tube, the time taken to fall the known distance between the calibration marks being measured and used to calculate the free fall velocity.

According to a more specific aspect of the present invention there is provided a treatment system suitable for the elimination of *Cryptosporidium* oocysts from water, said system including a filter bed comprising four layers of inert particulate material such that, from the top layer (first layer) to the bottom layer (fourth layer), the coarseness of the particles decreases while the density of the particulate material increases, the layers comprising in succession:

a first, top layer of particulate material comprising particles with a density in the range of 1.25 to 1.55 and within the size range of 1.6 to 2.5 mm; a second layer of particulate material comprising particles with a density in the range of 2.35 to 2.95 and within the size range of 0.5 to 0.85 mm; a third layer of particulate material comprising particles with a density in the range of 3.5 to 4.3 and within the size range of 0.2 to 0.6 mm; and a fourth, bottom layer of particulate material comprising particles with a density in the range of 4.0 to 6.0 and within the size range of 0.2 to 0.5 mm.

The shape factor of the particles in each of the first, second and third layers is preferably at least 0.6 and that of the particles in the fourth layer is preferably at least 0.5 (preferably at least 0.55).

The shape factor of the particles in all of the layers may be at least 0.6, typically at least about 0.65 in the case of the first, second and third layers.

The particles of which the first layer is composed may have a density in the range of 1.35 to 1.47.

The particles of which the second layer is composed may have a density in the range of 2.6 to 2.8.

The particles of which the third layer is composed may have a density in the range of 3.7 to 4.1.

The particles of which the fourth layer is composed may have a density in the range of 4.7 to 5.2.

As used herein, "density" refers to the density of the particulate material including porosity present in the particles.

The particles of which the first layer is composed may have a particle size within the range 1.7 to 2.4 mm.

The particles of which the second layer is composed may have a particle size within the range 0.6 to 0.85 mm.

The particles of which the third layer is composed may have a particle size within the range 0.4 to 0.5 mm.

The particles of which the fourth layer is composed may have a particle size within the range 0.3 to 0.4 mm.

As used herein, the term "particle size" means the particle size of the media determined by obtaining the geometrical mean size between two adjacent sieve sizes, the media in each case being sieved for three periods of 15 minutes to ensure a substantially uniform size. For each media, the top sieve size corresponds to the large particle size of the ranges specified above for the corresponding media while the bottom sieve size equates to the smaller particle size. The 15 minute sieving operations are carried out using the top and bottom sieves together so as to capture the desired particle size range.

By "inert material", we mean that for all practical purposes the material does not react chemically with the water undergoing treatment.

At least some, and preferably all, of the particulate materials employed in the filter bed may be porous.

The system may include means for effecting backwashing of the filter. Means may be provided for heating the backwash water before passage through the filter bed, preferably to a temperature of at least about 60 C.

In each of the aspects of the invention referred to above, in terms of the particulate materials used one or more of the following may apply:

(i) the particulate material forming the first layer may be selected from the group comprising anthracite, glass, cinders, activated carbon and mixtures of two or more of these materials. Preferably the first layer is formed by anthracite particles.

(ii) the particulate material forming the second layer may be selected from the group comprising crushed flint, silica, quartz and mixtures of two or more of these materials, the preferred material being crushed flint.

(iii) the particulate material forming the third layer may be garnet, alumina (preferably calcined alumina), stone, granite, brick, porcelain and mixtures of two or more of these materials, the preferred material being calcined alumina.

(iv) the particulate material forming the fourth layer may be magnetite and/or ilmenite.

To allow efficient backwashing and also to secure consistent capture of particulate matter from the water undergoing treatment, each of said layers of the filter bed will have similar voidages and the particles thereof will have similar degrees of porosity from one layer to the next.

The raw water may be subjected to flocculation treatment prior to filtration.

The raw water may be heated prior to passage through the filter bed in order to enhance flow rate through the filter bed.

Whilst a system in accordance with the invention is particularly effective in removing microorganisms such as Cryptosporidium oocysts, as a further safeguard against breakthrough the system may include means for treating the water (following filtration or before filtration) and/or the filter bed to render species such as Cryptosporidium inactive or destroy the same. For example, such means may comprise UV disinfection and/or pasteurisation at a suitable temperature (usually above about 60 to 65 degrees C.) and time interval (e.g. about 5 minutes) so as to ensure destruction of any infectivity.

Means may be provided for treating the filter bed after backwashing and prior to commencement of filtration in order to render species such as Cryptosporidium inactive or destroy the same. Such means may for instance involve the passage of steam through the filter bed to sterilise the same.

According to a further aspect of the present invention there is provided a method of treating water containing Cryptosporidium oocysts comprising passing the water through a filter bed as defined in said one aspect of the invention (or as modified in accordance with any one or more of the additional features specified above).

The invention will now be described by way of example only with reference to the accompanying drawings, in which:

FIG. 1 is a diagrammatic representation of one form of system suitable for the elimination of Cryptosporidium oocysts from water supplies, especially but not necessarily exclusively surface and sub-surface water supplies; and FIG. 2 is a graph illustrating free fall settling rates of various materials.

The system illustrated is typically used to clarify suspensions of low contaminant concentrations (e.g. less than 100 mg/liter) but may be used where necessary for the clarification of suspension with contaminant concentrations as high as 500 mg/liter while producing an acceptable liquid filtrate.

Referring now to the drawing, the system comprises a filter unit 10 in the form of a multi-layer bed having layers 1 to 6 of inert material which will usually be of differing composition from one layer to the next. The first four layers 1 to 4 are effective to afford a filtration quality sufficient to remove Cryptosporidium oocysts which are generally recognised to be in the size range of 4 to 10 microns. Typically the filtration quality of the filter unit is such that it is capable of removing particles of 1 micron or less. Layers 5 and 6 are support layers which do not play an active role in filtration of micron-sized particles but serve to retain the layers thereabove intact by preventing slippage of the smaller filter bed particles from the active part of filter bed during the filtration process.

The materials forming layers 1 to 4 are all porous materials and are selected with regard to their particle size, density and shape factor. In particular, it is important that the settling rate of particulate material in each layer differs from that of the neighbouring layers. Typically the particle size and density are selected so that the settling rate increases by a factor of the order of about 20% from the top layer 1 downwards to layer 4. FIG. 2 illustrates media size—vs—free fall velocity for different density particulate materials in water at 20 degrees C., namely for anthracite (layer 1), crushed flint (layer 2), alumina (layer 3) and magnetite/ilmenite (layer 4). Settling rate is of course inversely related to free fall velocity. It will be seen from FIG. 2 that it is possible to secure markedly different settling rates from one layer to the next by appropriate selection of the particle size and density.

The composition and characteristics of the layers forming the filter unit are set out in the Table below. The top layer in a preferred embodiment of the invention comprises particles of a material, preferably anthracite, which allows penetration of flocs into the filter bed under high loading conditions so as to allow long filter runs. The second layer comprises particles of material, such as crushed flint, which act as a polishing agent to remove substantially all of the fine flocs remaining after passage of the water through the top layer. The removal of microscopic organisms down to a single micron in size takes place mainly in the third layer and to a lesser extent in the fourth layer.

| Layer | Material | Shape Factor | Depth (cm) | Particle size $d_s$ (mm) | Density (g/cc) | Mean Free Fall Velocity (cm/s) |
|---|---|---|---|---|---|---|
| 1 | Anthracite | 0.65 | 23 | 1.7–2.4 | 1.40 | 6.9 |
| 2 | Crushed Flint | 0.75 | 23 | 0.5–0.85 | 2.65 | 8.3 |
| 3 | Calcined Alumina (Aloxite) | 0.77 | 23 | 0.4–0.5 | 3.90 | 10.1 |
| 4 | Magnetite or Ilmenite | 0.61 | 23 | 0.3–0.4 | 4.70 to 5.20 | 12.0 |
| 5 | Alumina Nuggets | — | 7 | 2.0–3.0 | 3.90 | — |
| 6 | High Density Granite Chippings | — | 15 | 10–20 | 3.00 | — |

The filter bed is supported upon a perforated base plate 12 within a column 14 having an inlet port 16 connected to a pumped supply of water to be treated, i.e. water sourced from a surface or sub-surface water supply. In the system illustrated, pumps used to handle contaminant containing water are of the low shear type to minimise any breakdown of particulate matter. The water to be treated may first be flocculated in a tank T1 using flocculants (such as the Magnafloc and Zetag range available from Allied Colloids) suitable for the treatment of potable water. The tank T1 may be equipped with a zetameter or similar device for determining that a desired degree of flocculation has been achieved before the water is transferred to the filter unit 10 and so that any compensation may be effected if the extent of flocculation deviates from a desired range as measured by the zetameter. The water enters the filter unit 10 at the top thereof and passes down through the multi-layer filter bed. If necessary, to ensure uniformity of water flow supplied to the filter bed, the water may be fed to the bed via a distribution manifold (not shown). Although not shown, the water feed to the filter unit may be preheated at any suitable point since small changes in temperature can result in signficant increase in the rate of flow through the filter bed.

In a filter bed having the characteristics specified in the Table, the full depth of the filtration media effectively functions as an operative surface area. This gives greater efficiency, which can manifest itself as, either a much higher throughput for a comparable size of unit or as the same throughput from a smaller and hence cheaper unit. The range of different types of suspended matter that can be separated is much wider than with other filtration systems due to the exceptional surface characteristics of the filter media used.

The base of the column 14 comprises a treated water collection chamber 18 for receiving treated water after passage through the filter bed and through the base plate 12. The chamber 18 has a port 20 for discharge of the treated water during the filtration process and through which compressed fluidising gas (e.g. compressed air) or backwash water can be admitted when backwashing of the filter bed becomes necessary. The compressed air or other gas is supplied from a source 50 via valve-controlled line 22 while backwash water is supplied via lines 24 and 25 from a backwash system described below.

The discharged treated water is fed via line 25 to a clarity meter 26 or the like to monitor the output quality of the water from the filter unit 10. The measurements derived from clarity meter 26 are used to control valves 28, 30 which, depending on whether the treated water meets predetermined quality standards, route "in-specification" treated water onward via line 32 for ultimate use or divert "out-of-specification" water to drain via line 34 where it may be collected and held until such time it meets the required specification (following further treatment if necessary).

Once the filtration process has been terminated, backwash water is supplied to the port 20 from a tank T2 via pump 36 and lines 24 and 25. The backwash water may be preheated by any suitable source of heat 40 such as an electrical immersion heater. Typically the backwash water in tank T2 is heated to and maintained at a temperature of at least 60 degrees C. The backwash water may be derived as needed from the filtered water via valved line 46.

For backwashing, the heated water is transferred from the backwash tank T2 to the underside of the filter unit 10 where it enters via the port 20. The backwash water is forced to flow upwardly through the filter bed into the top chamber 42 of the filter unit 10 where it is drawn off via valved line 44 into a backwash water collection vessel T3. The reverse flow action of the backwash water as it passes through the filter bed causes the filter bed to fluidise and *Cryptosporidium* oocysts and other particles trapped in the bed are carried out in the backwash water and collected in collection tank T3. If necessary, prior to backwashing of the filter bed, to assist separation of the filter media layers, the bed may be loosened by means of a jet of compressed air or other gas from source 50 which is admitted through the port 20 and is blown upwardly through the bed.

Once the backwash cycle has been completed, by virtue of characteristics of the materials forming the various layers of the filter bed, particularly the particle size, density and shape factor characteristics, the filter bed is able to resettle to its original configuration with a limited degree of intermixing of particles at the interfaces between the layers.

The collection tank T3 is equipped with means for destroying the *Cryptosporidium* oocysts—for example a heating source 45 whereby the tank contents can be heated to a temperature of at least 60 degrees C. for such time as necessary to ensure destruction of the oocysts, typically a minimum of ten minutes, so that the backwash water can then be safely disposed of. The treated backwash water may ultimately be disposed of via drain line 52.

In order to support the fine media of the filter bed formed by layers 1 to 4 and to provide good distribution of air and water during back washing, it is necessary to have an efficient under drain system. The under drain system for the filter serves a two fold purpose: to distribute the water uniformly during back washing and to collect the filtered water with out loss of media. The under drain itself consists of a top layer 5, which may comprise graded Aloxite (calcined alumina) nuggets, and a bottom layer 6 of high density gravel. The base plate 12 may comprise a plastic or stainless steel distributor plate which may incorporate calibrated slotted nozzles to give a good distribution of fluid during back washing.

A filter bed having the characteristics specified in the Table allows hydraulically stable conditions to be secured during reverse flow washing fluidisation of the bed. By selection of the densities and sizes of the materials forming the filter bed, it is possible to ensure that the discrete layered configuration of the bed is substantially restored following backwashing.

This design of filter has been found to be more efficient in retaining bacteria and parasites than rapid sand filters, particularly because of the formation of a biologically active bed that forms an effective barrier for colloids and particulates even in the sub-micron range.

Typically, a multi-media filter unit as described in connection with the drawings may be up to 2 metres in diameter and can be operated at filtration rates in the range of 10–15 gpm/ft$^2$ at 10 degrees C. and as high as 20–25 gpm/ft when the water temperature is raised to 40 degrees C. By direct comparison, the highest filtration rate attained by the latest design of rapid sand filter is only about 5 gpm/ft$^2$. The filter unit can typically clarify suspensions up to contaminant concentrations of 500 mg/liter while giving a final filtrate quality of less than 1.0 NTU. Internationally this result is classified as 'ultra-clear', and known to represent a particle removal efficiency of better than 99% at >2 microns. The higher filtration rates and longer filter runs that can be obtained with a multi-media filter unit as described herein provide a substantial saving of capital expenditure on new plant and, by comparison with a conventional sand filter, there is a large reduction in volume of wash water required to clean the filter bed. Additionally, the bed design allows very effective backwashing such that the volume of water used for adequate backwashing may be of the order of 0.5 to 1% of the volume of filtrate obtained during a filtration cycle.

During filtration of the raw water, the suspension particles passing through the filter bed are retained on the surfaces of the particulate media within the depth of the media, and a progressively clarified suspension (with depth) finally emerges as the filtrate. The particle capture mechanism provided by the porous particulate material has been found to enhance the removal of harmful parasitic micro-organisms present in process water supplies and in filter back washings (i.e. when the system is used to treat the backwash water).

As a safeguard against breakthrough of infective agents through the filter bed, further treatment may be employed to destroy or otherwise deactivate such agents. Thus, for example, the filtrate may be heated to a temperature of at least 60 degrees C. for a suitable time interval or steam heating of the filter bed can be applied under suitable conditions. Thus, steam may be used, if necessary, to sterilise the filter bed after backwashing and prior to a subsequent filtration cycle.

Various other methods may be used to ensure that micro-organisms other than *Cryptosporidium* oocysts are effectively eliminated from the treated water, including:

chlorine treatment; ozone treatment; chlorine dioxide treatment; and ultraviolet irradiation, e.g. at a dose of about 15 m Ws/cm2 is normally sufficient to give a 99.9% inactivation of most micro-organisms, provided the water has a high degree of clarity. However, to give a margin of safety, a minimum dose equivalent to 25 m Ws/cm2 at a wavelength of 254 nm is desirable. Such treatments may be applied downstream of the filter unit 10.

The illustrated system may be operated on a continuous or a batchwise basis and may be manually, semi-automatically or substantially wholly automatically operated.

In order to achieve a steady build-up of biomass throughout the entire depth of the multi-layer bed, it is essential to maintain the configuration of four discrete layers of support particles during expansion of the bed. The interfacial contact between the various support particles is controlled by the choice of particle size, shape (i.e. degree of sphericity), and density so that the benefits provided by the multi-media filter bed can be fully realised. The size of the support particles is selected to promote capture of the micro-organisms throughout the entire depth of the bed. The capture of these organisms is enhanced by the electrokinetic attraction force (i.e. zeta potential) which can be generated between the support particles and the organisms themselves.

Electrokinetic charge attraction is an important mechanism for removing micro-organisms. It utilises the natural charge, or zeta potential, generated by the suspended particles in aqueous liquids. These attraction forces can be augmented by carefully treating the micro-organisms and/or the filter bed with a quantity of the appropriately charged polyelectrolyte (cationic, anionic or non-ionic) so as to alter the surface conditions of the filter media particles (layers 1 to 4) or the support particles (layers 5 and 6). By means of such treatment, a stronger attraction can be achieved between the filter media particles and the particulate media of the filter bed.

Charge attraction is feasible in most filter media, but unless its zeta-potential is enhanced by chemical treatment, it does not make a significant contribution to the yield of biomass. This applies generally to most bacteria, viruses, proteins and pyrogens. When these organisms are suspended in aqueous liquids at pH7 or higher, they will generate a negative zeta potential. This potential usually varies between 0 and 60 millivolts from which originates the electrostatic repellence which is the main stability factor of the suspension. In the case of hydrophilic organic suspensions, the presence of protective substances (so-called protective colloids) helps to increase the stability of the suspension.

By introducing into a suspension (water containing contaminants), with negative zeta potential, suitable quantities of a trivalent cation such as $Al^{+++}$ (aluminium sulphate) or $Fe^{+++}$ (ferric chloride), the zeta potential is neutralised so that there is no longer repellence between the particles and the cohesive forces produce flocculation.

A multi-layer filter bed in accordance with the invention has several potential advantages deriving from its hydraulic stability which allows a steady-state build-up of accumulated biomass at higher growth-rates. This situation leads to the rapid development of a biomass concentration that is much higher than that experienced when using other conventional methods using for example sand filters.

The four discrete layers 1 to 4 of support particles employed in the filter bed of the present invention form a multi-layer system that provides a very effective external surface for the growth/accumulation of biospecies. Moreover, particle shapes having a high degree of sphericity have advantages associated with ease of fluidisation. In contrast, particles that are signficantly or wholly non-spherical create higher pressure drops within the bed causing discontinuities in the biomass build-up process. Shape factor (which is representative of the degree of sphericity) has been found to be a significant factor in the achievement of a turbulent-free flow regime in the filter bed and hence a uniform build-up of biomass. A further important advantage of support particles with a consistent shape-factor over non-spherical particles is that bed porosities are lower leading to higher biomass hold-ups.

Whilst endeavouring in the foregoing specification to draw attention to those features of the invention believed to be of particular importance, it should be understood that the Applicant claims protection in respect of any patentable feature or combination of features disclosed herein and/or shown in the drawings whether or not particular emphasis has been placed on such feature or features.

The invention claimed is:

1. A water treatment system, said system including a filter bed comprising four layers of inert particulate material such that, from the top layer (first layer) to the bottom layer (fourth layer), the coarseness of the particles decreases while the density of the particulate material increases, the layers comprising in succession:

- a first, top layer of particulate material comprising particles with a density in the range of 1.25 to 1.55 g/cc and within the size range of 1.6 to 2.5 mm;
- a second layer of particulate material comprising particles with a density in the range of 2.35 to 2.95 g/cc and within the size range of 0.5 to 0.85 mm;
- a third layer of particulate material comprising particles with a density in the range of 3.5 to 4.3 g/cc and within the size range of 0.2 to 0.6 mm; and
- a fourth, bottom layer of particulate material comprising particles with a density in the range of 4.0 to 6.0 g/cc and within the size range of 0.2 to 0.5 mm.

2. A system as claimed in claim 1 in which the shape factor of the particles in each of the first, second and third layers is at least 0.6 and that of the particles in the fourth layer is at least 0.5.

3. A system as claimed in claim 1 in which the shape factor of the particles in all of the layers is at least 0.6.

4. A system as claimed in claim 3 in which the shape factor of the first, second and third layers is at least about 0.65.

5. A system as claimed in claim 1 including means for effecting backwashing of the filter.

6. The system as claimed in claim 1 in which means is provided for heating the backwash water before passage through the filter bed.

7. A system as claimed in claim 1 including means for heating the backwash water to a temperature of at least about 60° C.

8. A system as claimed in claim 1 in which:
the particulate material forming the first layer is selected from the group comprising anthracite, glass, cinders, activated carbon and mixtures of two or more of these materials; or
the particulate material forming the second layer is selected from the group comprising crushed flint, silica, quartz and mixtures of two or more of these materials; or
the particulate material forming the third layer is selected from garnet, alumina, stone, granite, brick, porcelain and mixtures of two or more of these materials; or
the particulate material forming the fourth layer is selected from the group comprising magnetite and ilmenite.

9. A system as claimed in claim 1 including means for subjecting the raw water to flocculation treatment prior to filtration.

10. A system as claimed in claim 1 including means for heating the raw water prior to passage through the filter bed in order to enhance flow rate through the filter bed.

11. A system as claimed in claim 1 including means for treating the water following filtration or before filtration and/or the filter bed to render species such as *Cryptosporidium* inactive or destroy the same.

12. A system as claimed in claim 1 including means for treating the filter bed after backwashing and prior to commencement of filtration in order to render species such as *Cryptosporidium* inactive or destroy the same.

13. A system as claimed in claim 1 in which such filter bed treatment means comprises means for passing steam through the filter bed to sterilise the same.

* * * * *